United States Patent [19]

Wheeler et al.

[11] Patent Number: 5,268,394
[45] Date of Patent: Dec. 7, 1993

[54] STABILIZATION OF POLYOXYALKYLENE POLYETHER POLYOLS

[75] Inventors: Edward L. Wheeler, Watertown; Lawrence B. Barry, Newington; Mark C. Richardson, Cheshire, all of Conn.

[73] Assignee: Uniroyal Chemical Company, Inc., Middlebury, Conn.

[21] Appl. No.: 15,329

[22] Filed: Feb. 9, 1993

Related U.S. Application Data

[63] Continuation of Ser. No. 756,745, Sep. 9, 1991, abandoned.

[51] Int. Cl.$^5$ .................... C08K 5/18; C08K 5/34; C08K 5/46; C08K 5/49
[52] U.S. Cl. .................... 521/108; 521/117; 521/121; 521/128; 524/89; 524/120; 524/128; 524/153; 524/258; 524/291; 524/349
[58] Field of Search ............... 524/89, 120, 153, 128, 524/258, 291, 349; 521/108, 117, 121, 128

[56] References Cited

U.S. PATENT DOCUMENTS

| | | | |
|---|---|---|---|
| 3,567,664 | 3/1971 | Haring | 521/175 |
| 3,637,865 | 1/1972 | Haring | 524/258 |
| 3,798,184 | 3/1974 | Cuscurida et al. | 524/255 |
| 4,010,211 | 3/1977 | Preston | 524/258 |
| 4,130,513 | 12/1978 | Reale et al. | 521/107 |
| 4,146,687 | 3/1979 | Reale | 521/107 |
| 4,794,126 | 12/1988 | Fiesman et al. | 521/117 |
| 4,933,374 | 6/1990 | Suhoza et al. | 521/117 |

FOREIGN PATENT DOCUMENTS

EP502520 9/1992 Italy.
1085082 9/1967 United Kingdom.

*Primary Examiner*—Paul R. Michl
*Assistant Examiner*—Tae H. Yoon
*Attorney, Agent, or Firm*—Raymond D. Thompson

[57] ABSTRACT

The invention relates to the use of an acridans of Structure (I) as a stabilizer, preferably combined with hindered amine, phenolic, and phosphite stabilizers for stabilizing polyether polyols for polyurethane flexible foams and as stabilizers for the polyglycols, heat transfer fluids, lubricating additives.

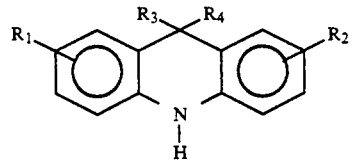

14 Claims, No Drawings

STABILIZATION OF POLYOXYALKYLENE POLYETHER POLYOLS

This is a continuation of application Ser. No. 07/756,745 filed Sep. 9, 1991 now abandoned.

FIELD OF THE INVENTION

The present invention relates to the stabilization of polyoxyalkylene polyether polyols and the use of the stabilized polyols in the preparation of polyurethane foam. In particular the invention relates to stabilization of polyols with certain stabilizer compositions and the color stability or scorch inhibition of flexible and semi-flexible polyurethane foams made from the stabilized polyols.

BACKGROUND AND RELATED ART

Prior art methods for the stabilization of polyalkylene polyether polyols with antioxidants or stabilizers and the use of stabilized polyols in the preparation of polyurethane foams to inhibit scorch are well known. Polyether polyols, used in the manufacture of slabstock flexible urethane foam, are typically stabilized with antioxidant packages consisting of phenolic and amine antioxidants, and may also contain the synergist phenothiazine.

U.S. Pat. Nos. 3,567,664 and 3,637,865 disclose polyurethane foams stabilized with a mixture of 2,6-di-tert-butyl-4-methyl phenol [butylated hydroxy toluene (BHT)] and p,p'-dialkyldiphenylamines. U.S. Pat. No. 4,010,211 teaches the addition of phenothiazine to a BHT/p,p'-dialkyldiphenylamine mixture. U.S. Pat. No. 4,794,126 discloses flame-retardant polyurethane foams stabilized with a combination of a diarylarylenediamine, a reaction product of diarylamine and alkyl ketone and a hindered phenol, specifically 3,6'-di-tert-butyl-4-sec-butyl phenol.

U.S. Pat. No. 4,933,374 discloses polyoxyalkylene polyether polyol compositions protected against oxidative degradation with a stabilizing amount of a synergistic mixture of 2,6-di-tert-butyl-4-sec-butyl phenol and a reaction product of diisobutylene, styrene, and diphenylamine wherein the weight ratio of the diisobutylene to the styrene is from about 2:1 to 5:1.

U.S. Pat. No. 4,551,493 is concerned with transparent flame-retardant poly(arylether-arylsulfone) molding materials. An example of a heat stabilizer given is a hindered phenol and a diphenylamine/acetone condensate. In this patent, the final product is used as a flame-proofing agent for plastic molding materials. Certain simple acridan compounds of the instant invention are disclosed but not exemplified as useful in stabilization of the sulfur bearing poly (aryletherarylsulfone) polymers. Furthermore, the cyclic or linear diphenylamine/acetone condensate of U.S. Pat. No. 4,551,493 are used in combination with a poly(2,6-dibromophenylene 1,4-oxide). The compositions of the instant invention are not halogenated in any manner nor do the stabilized polymer chains contain a sulfur linkage.

Antioxidants are used in polyether polyols to protect the polyol from oxidation during the final stages of manufacture; to reduce peroxide formation during storage; and to reduce the possibility of scorching the flexible polyurethane slabstock foam due to thermal oxidative degradation.

The compounds of this invention are particularly important to the polyol/flexible urethane industry due to the increased concern over chlorofluorocarbons (CFCs) and their deleterious effect on the earth's ozone layer. CFCs are incorporated in flexible slabstock foam to serve as an auxiliary blowing agent and for the removal of heat during slabstock production. The absence of CFCs places a higher performance requirement on the stabilization system, since the CFCs prevent discoloration, physical scorch and self-ignition of the foam.

The presence of scorch is of major concern to the foam manufacturers since it negatively affects the appearance of the product, causes physical damage and may result in fire. Recent regulations eliminating the use of CFCs in polyurethane foam manufacture require enhanced scorch protection during flexible slabstock foam production.

It would therefore be advantageous to have a antioxidant system for polyether polyol stabilization that provide increased scorch protection, allow foams to be produced at higher internal temperatures, and eliminate the use of CFCs without adverse effects to the foam.

Accordingly, it is an object of this invention to provide a stabilizer system for polyether polyols which provides valuable protection for oxidation, scorching, and discoloration of resultant foam produced, including those foams produced containing flame retardants.

It is a further object of this invention to provide an environmentally friendly stabilization package for polyether polyols. More specifically, a stabilization package which holds the possibility of eliminating the need for chlorofluorocarbons, heretofore used in flexible polyurethane foam production.

It is a still further object of this invention to provide a flexible polyurethane foam product made from the stabilized polyol together with an isocyanate with improved scorch performance, appearance, and color.

The foregoing and additional objects will become more evident from the following description and Examples.

SUMMARY OF THE INVENTION

The stabilizers of the instant invention is comprised of a class of amine stabilizers, known as acridans, which shows efficacy as well as unexpected synergy when combined with traditional amine, phenolic, phenothiazine and phosphite stabilizers in stabilizing polyether polyols for polyurethane flexible foams which may contain flame retardants as well as other non-sulfur contained polymers subject to heat and oxidane degradation.

Another aspect of this invention concerns a method for the stabilization of polyalkylene polyether polyols against oxidative degradation and the use of such a stabilized polyol together with polyisocyanates to prepare scorch stabilized polyurethane foams.

Yet another aspect of this invention concerns a method of stabilizing polyglycols, heat transfer fluids, lubricating additives, and the like using the synergist of this invention with traditional stabilizers to increase the efficacy of the stabilizer system and enhance the properties of the respective products.

DETAILED DESCRIPTION OF THE INVENTION

In one aspect, the instant invention is directed to the use of:

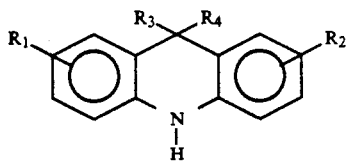

I wherein $R_1$, $R_2$, $R_3$, $R_4$ can be H, $C_1$–$C_{18}$ alkyl, or $C_7$–$C_{18}$ aralkyl. $R_3$ and $R_4$ can also be aryl, preferably phenyl.

The term, "acridan", as depicted in structure I above will be used hereinafter to refer to the group of compounds structurally represented by (I). The acridan may be optionally combined with an amine stabilizer of the structure II

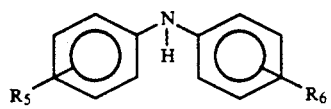

II wherein $R_5$ and $R_6$ can be H, $C_1$–$C_{18}$ alkyl, $C_7$–$C_{18}$ aralkyl, a phenolic stabilizer of structure III

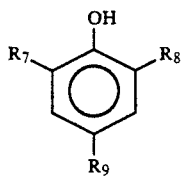

III wherein $R_9$ can be $C_1$–$C_{18}$ alkyl or $C_7$–$C_{18}$ aralkyl and $R_7$ and $R_8$ are $C_4$–$C_{12}$ alkyl, $C_7$–$C_{12}$ aralkyl, preferably t-butyl; or optionally combined with a phosphite stabilizer of the formulas IV or V.

$$(R_{10}O)_3-P \qquad \text{IV}$$

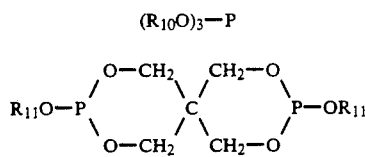

V wherein $R_{10}$ and $R_{11}$ are independently selected from $C_6$–$C_{18}$ alkyl, aryl, $C_7$–$C_{18}$ aralkyl, or $C_7$–$C_{18}$ alkaryl.

Examples of such known stabilizing amines, phenols, and phosphites include dioctyl diphenylamine, butylated hydroxytoluene, (2,6-di-t-butyl-4-methylphenol), phenothiazine, 4,4'-bis(alpha,alpha-dimethylbenzyl)diphenylamine, styrenated diphenylamines, diisobutylated diphenylamines, mixtures of styrenated and diisobutylated diphenylamines, mixtures of styrenated and α,α,dimethylbenzyl diphenylamines, mixtures of butyl, dibutyl, and octyl diphenylamines, dimerized 2,2'-methylene bis-6-t-butyl-p-cresol, 2,6-di-t-butyl 4-sec-butylphenol, tris(nonylphenyl) phosphite, tris(2,4-di-t-butylphenyl) phosphite and the like.

Preferred substituents of Structure I include those when $R_1$ and $R_2$ are hydrogen and $R_3$ and $R_4$ are alkyl. A more preferred substitution would include $R_1$ and $R_2$ as hydrogen and $R_3$ and $R_4$ as methyl.

A preferred amine compound for the stabilizer package of this invention includes structure II above wherein $R_5$ and $R_6$ are α,α,dimethylbenzyl.

A preferred phenolic stabilizer of this invention includes structure III above wherein $R_9$=sec-butyl or methyl and $R_7$ and $R_8$ are t-butyl.

The stabilizer system containing an acridan along with currently used commercially available stabilizers will contain from 1 to 50% by weight of the acridan component in the polyether polyol stabilizer system. A preferred range is from 2 to 20% by weight of the acridan component in the polyether polyol stabilizer system. A most preferred range is from 2 to 10% by weight of the acridan component in the polyether polyol stabilizer system.

In another aspect, this invention relates to the manufacture of flexible polyurethane slabstock manufactured from polyether polyols stabilized by the compositions described herein.

The commercially available amine and phenolic antioxidants utilized in the compositions of this invention are known by several trademarks including NAUGALUBE ™ 680, 635, or 640 brand amine antioxidants, NAUGARD ™ 445 brand 4,4'-bis-(alpha,alpha-dimethylbenzyl)diphenylamine antioxidant; NAUGARD ™ BHT brand 2,6-di-t-butyl-4-methylphenol antioxidant, NAUGARD ™ PS-20 brand styrenated diphenylamine antioxidant, NAUGARD ™ PS-30 brand butylated octylated diphenylamine antioxidant (trademarks of the Uniroyal Chemical Company); ISONOX ™ 132 brand 2,6-di-t-butyl-4-sec-butylphenol antioxidant (trademark of Schenectady Chemical Company) and others. Other commercially available antioxidants considered to be within the scope of this invention include phenothiazine, phosphites, bisphenols, and the like. These type products are well-known and familiar to those skilled in the art. Acridans provide increased performance in systems where simply increasing antioxidant levels shows little or no increase in performance.

SYNTHESIS OF THE ACRIDANS

The acridan component of this invention was synthesized by the following procedure: The low temperature reaction product of diphenylamine and acetone is synthesized according to U.S. Pat. No. 2,202,934 (available as AMINOX ™ from Uniroyal Chemical Company) and 3% by weight iodine were heated to 240° C. for four hours. The crude reaction mixture, which contained diphenylamine, dimethylacridan, isopropyl diphenylamine, and dimers and trimers of various alkylated diphenylamines, was carefully fractionally vacuum distilled. The portion boiling at 130°–140° C. at 0.3 mm Hg was collected. The desired product, 9,10-dihydro-9,9-dimethylacridan (abbreviated a AC1 in Table 1), was recrystallized from hexanes. The product yield was <30%.

Other acridans of Structure (I) are made by an analogous reaction of a p-di-alkylated diphenylamine with a ketone where the alkyl substituents of the DPA are $R_3$ and $R_4$ and the ketone is of the form

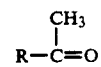

where R is $C_1$–$C_{18}$ alkyl, or aryl, alkaryl ($C_7$–$C_{18}$) or $C_1$–$C_{18}$ aralkyl of Structure I and other synthesis techniques and routes can be contemplated to produce improved selectivity and yield.

Synthesis of AC2 and AC3 referring to Structure I, the compound referred to hereinafter as AC2 has the following representative structure: $R_1$, $R_2$ are t-octyl, $R_3$ is phenyl and $R_4$ is methyl. AC3 compound has $R_1$ and $R_2$=t-butyl, $R_3$ is phenyl and $R_4$ is methyl.

A di-p-t-octyl-diphenylamine was reacted with acetophenone to form the acridan AC2; in the case of AC3 di-p-t-butyl diphenylamine was reacted with acetophenone. This AC2 and AC3 compounds demonstrated excellent utility although AC1 is slightly superior; therefore, AC1 is highlighted in the subsequent comparisons with commercial control stabilization systems.

STABILIZER PACKAGE PREPARATION

The acridan component of the stabilizer package was combined with commercially available amine and phenolic stabilizers including dioctyl diphenylamine (abbreviated as dioctyl DPA), 2,6-di-t-butyl-4-methylphenol (butylated hydroxytoluene or BHT), phenothiazine (PTZ), 4,4'-bis (alpha,alpha-dimethylbenzyl)-diphenylamine (also known as NAUGARD TM 445 and abbreviated in Table 1 as 445), 2,6-di-t-butyl-4-sec-butylphenol (also known as ISONOX TM 132 and abbreviated as 132), a mixture of styrenated/-diisobutylated diphenylamine.(also known as NAUGALUBE TM 680) according to the amounts listed in Table 1. Each combination was tested for poly-. ether polyol stabilizer performance.

EXAMPLES

TABLE 1

| Component | Example | | | | | |
|---|---|---|---|---|---|---|
| | A | B | C | D | 1 | 2 |
| Dioctyl.DPA | 2200 | 1950 | — | — | — | — |
| BHT | 2200 | 2150 | 2200 | 2150 | — | 2150 |
| PTZ | — | 100 | — | 100 | — | — |
| 445 | — | — | 2000 | 1950 | — | 1950 |
| 680 | — | — | — | — | 1950 | — |
| 132 | — | — | — | — | 2150 | — |
| AC1 | — | — | — | — | 100 | 100 |

In order to demonstrate the effectiveness of the stabilizer systems of this invention, they were evaluated against commercial antioxidant stabilizer packages. Both the commercial and experimental types of stabilizer systems are listed in Table 1. All of the antioxidant packages were loaded into 3,000 average molecular weight polyol at levels typically used by the major polyol producers, ranging from 0.2 to 0.7 weight percent.

The polyols used in these tests were selected from the commercially available polyols VORANOL TM 3137 brand polyether polyol (trademark of the Dow Corporation) or NIAX TM 16-52 brand polyether polyol (trademark of the Union Carbide Corporation). The average molecular weight of these materials is approximately 3000.

The polyether polyols that were stabilized by these stabilizer systems indicated in Table 1, were tested by differential scanning calorimetry (DSC), thermogravimetrically analyzed (TGA) and APHA color tested. The procedures and results of these tests are given below.

TGA METHOD/ANALYSIS

Thermogravimetric analysis measures the dynamic relationship between the temperature and the mass of a system. By comparing the mass of a sample to that of a controlled system, the temperature at which weight loss is experienced due to evaporation, decomposition, or combustion may be determined.

In this evaluation, a sample weighing approximately 30 mg was placed in the sample chamber of a Perkin-Elmer TGS-2 Thermo Gravimetric Analyzer. The chamber was then equilibrated, under nitrogen, to 130° C. Once equilibrated, the gas in the sample chamber was switched from nitrogen to air at a flow rate of 100 cc/min and the temperature ramped at 5° C./min until 100% weight loss of the sample had occurred. Although actual foam formulations contain many components which are not present in the TGA test, it is considered an excellent means for initial screening of antioxidant candidates. The data in Table 2 indicates that of the various antioxidant packages, Samples 5 and 6, containing the synergistic acridan compound of this invention, provide equivalent or better performance than the commercial packages evaluated.

DSC ANALYSIS OF POLYOL

Differential scanning calorimetry (DSC) measures the endothermic or exothermic heat of reaction and can give the precise temperature of this initial reaction. A sample weight of approximately 30 mg was placed in the sample chamber of a Perkin-Elmer DSC-2C. The instrument was equlibrated, under nitrogen flow, to 130° C. Once equilibrated, the gas in the sample chamber was switched from nitrogen to air at a flow rate of 100 cc/min and the temperature ramped at 10° C./min with the temperature in K recorded at the time of the exotherm. The DSC results shown in Table 2 shows samples 5 and 6, containing the synergist of this invention, to be superior to all other packages evaluated.

Additionally, APHA color testing of the polyols stabilized with samples 1-6, as well as an unstabilized polyol sample, are presented in Table 2. The APHA Platinum-Cobalt system used follows ASTM D1209. The values on this scale range from 0 (water white) to 300 (cream white). This data is presented because of the importance of color to the polyol manufacturers. The lower values, indicating lightest color, are those most desirable.

It can be seen from the data that the addition of any stabilizer package adds to the APHA, but the value of sample 2, with stabilizer package containing the synergistic compound of this invention, is equal to the lowest value for a commercially available stabilizer package.

TABLE 2

| Example # | DSC (K) | APHA color | TGA analysis:weight loss (°C.) | | |
|---|---|---|---|---|---|
| | | | initial | 10% | 20% |
| A | 496.1 | 30 | 202 | 230 | 230 |
| B | 503.0 | 35 | 215 | 236 | 242 |
| C | 492.9 | 25 | 203 | 224 | 233 |
| D | 503.3 | 30 | 211 | 227 | 236 |
| 1 | 505.4 | 30 | 212 | 238 | 244 |
| 2 | 504.2 | 25 | 212 | 236 | 243 |

The aforementioned polyether polyols are used in the production of slabstock flexible polyurethane foam. Samples of polyurethane foam were made and tested by thermogravimetric analysis and microwave scorch as well.

Testing conditions used to evaluate polyurethane foam samples were the same as conditions used in the evaluation of polyol by TGA (described above) except that the sample weight was approximately 8 mg because of the increased density of the foam. Platinum wires were used to compress the foam samples onto the aluminum sample pan in order to obtain a reasonable sample weight.

The small hand-mixed foam samples were made by the procedure below, and is typical of formulations used by the polyol manufacturers. A premix of 10.0 grams of water, 0.30 grams of an amine catalyst DABCO TM 33-LV brand triethylene-diamine sold and trademarked by Air Products & Chemicals) and 2.0 grams of a surfactant (L-5810, a tin catalyst sold by Union Carbide) was added to 200 grams of a 3000 average molecular weight polyether polyol which had minimal initial stabilization (100 ppm BHT) but also containing the stabilizer package indicated in Table 1. The formulation may also contain a flame retardant as used by foam manufacturers. These flame retardants are typically chlorinated, chlorinated and brominated or brominated phosphates. The mixture was stirred for five seconds in a high speed Lightning Mixer. Then 0.40 grams of tin catalyst (stannous octoate in dioctylphthalate) was added and the resulting mixture stirred for five seconds in the Lightning Mixer. Finally, 126.0 grams of toluene diisocyante (TDI-80, 80% 2,6-/20% 2,4-toluene diisocyante sold by Mobay) was added and the mixture stirred in the Lightning Mixer for 7 seconds and subsequently poured into a 10"×10"×5" cardboard box. The foam was allowed to rise completely at room temperature.

These foams were not subjected to any additional heating either by microwave or air circulating oven. The foam buns were allowed to stand for a day, with samples taken midway between the center and the outer surface of the foam bun. Table 3 shows the performance of the commercially available as well as the experimental stabilizer packages that are the subject of this invention. Examples 1 and 2 demonstrate superior performance as compared to comparative Examples A-D.

The microwave scorch test is a rapid and reproducible small scale test which correlates well with observed results from large machine prepared foams. This procedure utilizes small hand mixed foam samples in order to evaluate the effectiveness of antioxidant packages. Because foam buns will dissipate the internal heat more rapidly than foam buns produced on an industrial scale, a microwave oven is used to uniformly heat the foam bun by radiant energy rather than by conduction of heat. This promotes uniform heating of the small foam bun resulting in reproducible scorch values. The formulation used to prepare the foam buns is given above, and is typical of the formulations used in the industry.

After the formulation was prepared, it was poured into a 10"×10"×5" cardboard box and allowed to rise. Five minutes after the appearance of bubbles on the surface of the foam, the sides of the box are pulled away from the foam bun and immediately placed into a preconditioned microwave oven for 5 minutes and 30 seconds at 60% power. The microwave oven is preconditioned by heating a 1000 ml beaker containing 600 ml of water for 30 minutes prior to the first foam bun tested, with a fresh beaker returned to the microwave for each bun tested, to maintain a constant temperature and humidity within the microwave during testing.

Upon removal of the foam bun from the microwave oven, it is placed into an air circulating oven for 3 minutes at 125° C. to cure the skin of the bun. Upon removal from the air circulating oven, the foam sample was cut in half, perpendicular to the rise of the foam and inspected for degree of scorch. A one-inch thick slice is cut from the center of each bun and analyzed via a Hunter Lab Colorimeter, Model D25M/L.

The Hunter Color values on both the B scale (measuring yellowness or blueness) and the E scale (total color difference compared to white) were compiled for all six samples and may be found in Table 3. These data demonstrate that comparative Example D provides the highest scorch protection of the commercial systems evaluated, while Example 1 provides a slight increase in scorch protection over the Example C, while Example 2 provides a sizeable increase in scorch protection over comparative Example D.

TABLE 3

| Example # | TGA:% WT Loss | | Microwave Scorch | |
|---|---|---|---|---|
| | 190° C. | 250° C. | Hunter B | Hunter E |
| A | 99.3 | 88.3 | 21 | 38 |
| B | 99.3 | 89.0 | 22 | 37 |
| C | 99.3 | 88.0 | 19 | 32 |
| D | 99.3 | 88.5 | 11 | 15 |
| 1 | 99.4 | 89.3 | 18 | 25 |
| 2 | 99.4 | 89.5 | 6 | 10 |

STABILIZATION OF OTHER POLYMERIC SYSTEMS

The acridans of the invention may be used in a wide variety of polymers and long chain hydrocarbons which do not contain sulfur linkages in the chains. These may include polyolefins, petroleum based oils, lubes and greases as well as polyalkylene glycols, preferably polyethylene glycols and methoxy polyethylene glycols such as the CARBOWAX TM brand polyethylene glycols family of products (trademarked and marketed by Union Carbide Chemical and Plastics Company). These oxidizable compositions benefit greatly from use of the stabilizer systems described herein.

Various stabilization systems, including several containing the acridan synergists of this invention, were evaluated in polyglycol. The polyglycol used was P-2000 (a product of Dow Chemical) and the stabilizers employed included the comparative control, BHT, described above.

COMPARATIVE EXAMPLE E AND EXAMPLES 3-5

To a 10 gram commercial sample of P-2000 polyglycol, 1.0% of each stabilizer package was added. The samples were evaluated via differential scanning calorimetry as described above using a Perkin-Elmer DSC Model 2C which was calibrated using an indium standard. Approximately 7 mg of samples were weighed into an aluminum pan and were equilibrated at 373K with nitrogen flow, and then ramped at 10° K./min with air flow of 50 cc/min until exotherm. The content of each stabilizer package along with the temperature to exotherm, is presented in Table 4 below.

TABLE 4

| | Example # | | | | |
|---|---|---|---|---|---|
| Component | E | 3 | 4 | 5 | 6 |
| Naugard 445 | — | 0.5 | 0.5 | 0.5 | 1.0 |
| BHT | 1.0 | — | — | — | |
| AC1 | — | 0.5 | — | — | |
| AC2 | — | — | 0.5 | — | |
| AC3 | — | — | — | 0.5 | |
| Temp to Exotherm (C.) | 198 | 256 | 253 | 247 | 215 |

The above DSC results show a consistently higher temperature to exotherm. The Acridans of the invention, AC1, AC2, AND AC3 show markedly higher temperatures to exotherm than the recognized control BHT, or when Naugard 445 is run by itself.

The data presented herein are intended to illustrate, but in no way to limit the scope of the invention. Other variations will be evident to those skilled in the art and such modifications are intended to be within the scope of this invention as defined by the following claims.

What is claimed is:

1. A sulfur-free oxidizable polyoxyalkylene polyether polyol composition stabilized against thermal and oxidative degradation by the incorporation therein of a minority amount of a stabilizer system consisting essentially of:

(a) at least one acridan compound provided that the acridan compound(s) is(are) represented by the structure:

[Structure I: acridan with $R_1$, $R_2$, $R_3$, $R_4$ substituents and NH]

wherein $R_1$, $R_2$ can be H, $C_1$–$C_{18}$ alkyl or $C_7$–$C_{18}$ aralkyl and $R_3$ and $R_4$ may be aryl or $C_1$–$C_{18}$ alkyl or $C_7$–$C_{18}$ aralkyl, (b) a amine stabilizer of the structure

[Structure II: diphenylamine with $R_5$, $R_6$ substituents and NH]

wherein $R_5$ and $R_6$ are individually selected from H, $C_1$–$C_{18}$ alkyl, and $C_7$–$C_{18}$ aralkyl, and (c) a phenolic stabilizer of the structure

[Structure III: phenol with OH, $R_7$, $R_8$, $R_9$ substituents]

wherein $R_9$ can be $C_1$–$C_{18}$ alkyl or $C_7$–$C_{18}$ aralkyl and $R_7$ and $R_8$ are $C_4$–$C_{12}$ alkyl or $C_7$–$C_{12}$ aralkyl.

2. The oxidizable composition of claim 1 consisting essentially of:
a phosphite stabilizer of the formula:

$$(R_{10}O)_3-P$$

or

[Structure: bicyclic phosphite with $R_{11}O-P$ and $P-OR_{11}$ groups]

wherein $R_{10}$ and $R_{11}$ are independently selected from $C_6$–$C_{18}$ alkyl, aryl, $C_7$–$C_{18}$ aralkyl, or $C_7$–$C_{18}$ alkaryl.

3. The oxidizable composition of claim 1 wherein $R_1$ and $R_2$ are hydrogen and $R_3$ and $R_4$ are alkyl.

4. The oxidizable composition of claim 1 wherein $R_1$ and $R_2$ as hydrogen and $R_3$ and $R_4$ as methyl.

5. The oxidizable composition of claim 1 wherein $R_5$ and $R_6$ are alpha,alpha-dimethylbenzyl.

6. The oxidizable composition of claim 1 wherein $R_9$ is sec-butyl or methyl and $R_7$ and $R_8$ are t-butyl.

7. The oxidizable composition according to claim 1 wherein the acridan is present in the amount ranging from about 1 to about 10% by weight.

8. The oxidizable composition of claim 1 wherein said acridan is present in from about 0.1 to about 2.0 weight percent with the remainder of said oxidizable composition being polyglycols, heat transfer fluids, and hydrocarbon oils, greases or lubricants.

9. The manufacture of flexible polyurethane slabstock manufactured from an isocyanate and polyether polyols stabilized by the stabilizer system of claim 1.

10. A polyether polyol composition stabilized against degradation comprising:

(a) a polyether polyol and;
  (b) a stabilizer system consisting essentially of:
    1) at least one acridan compound provided that the acridan compound(s) is(are) represented by the structure:

[Structure I: acridan with $R_1$, $R_2$, $R_3$, $R_4$ substituents and NH]

wherein $R_1$, $R_2$, can be H, $C_1$–$C_{18}$ alkyl or $C_7$–$C_{18}$ aralkyl and $R_3$ and $R_4$ may be aryl or $C_1$–$C_{18}$ alkyl or $C_7$–$C_{18}$ aralkyl; and 2) additionally a highly hindered amine compound and a phenolic compound, both compounds being known to exhibit stabilizing properties.

11. The oxidizable composition of claim 10 wherein said additional amine compound consists essentially of: an amine stabilizer of the structure

[Structure II: diphenylamine with $R_5$, $R_6$ substituents and NH]

wherein $R_5$ and $R_6$ are individually selected from H, $C_1$–$C_{18}$ alkyl, $C_7$–$C_{18}$ aralkyl, or $C_7$–$C_{18}$ alkaryl.

12. The composition of claim 10 wherein said additional phenolic compound consists essentially of:
a phenolic stabilizer of the formula

[Structure III: phenol with OH, $R_7$, $R_8$, $R_9$ substituents]

wherein $R_9$ can be $C_1$–$C_{18}$ alkyl, $C_7$–$C_{18}$ aralkyl, or and $R_7$ and $R_8$ are $C_4$–$C_{18}$ alkyl, $C_7$–$C_{12}$ alkyl.

13. The polyether polyol composition of claim 10 further consisting essentially of:
a phosphite stabilizer of the formula IV $$(R_{10}O)_3\text{-P} \qquad \text{IV}$$

14. A composition according to claim 1 further consisting essentially of comprising a phenothiazine.

* * * * *